B. G. FITZHUGH.
Dumping Carts.
No. 140,025.　　　　　　　　　　Patented June 17, 1873.
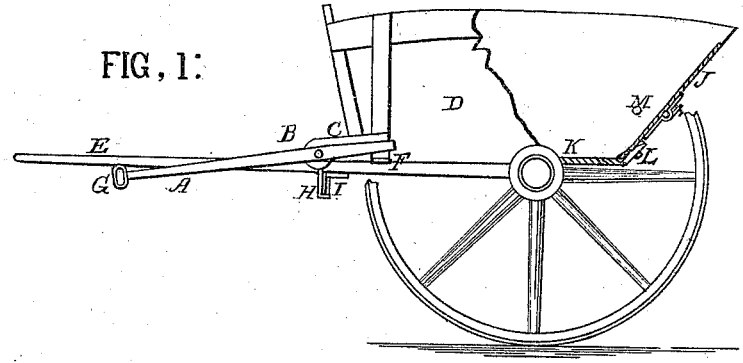
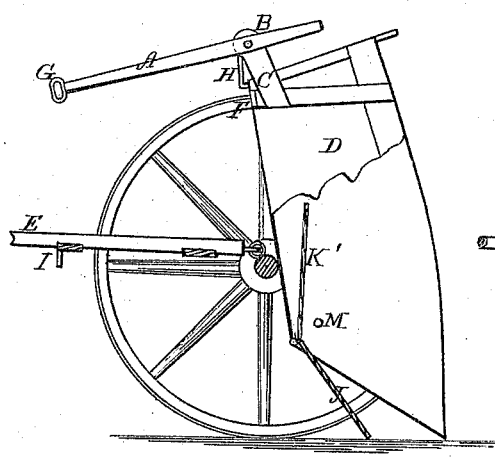
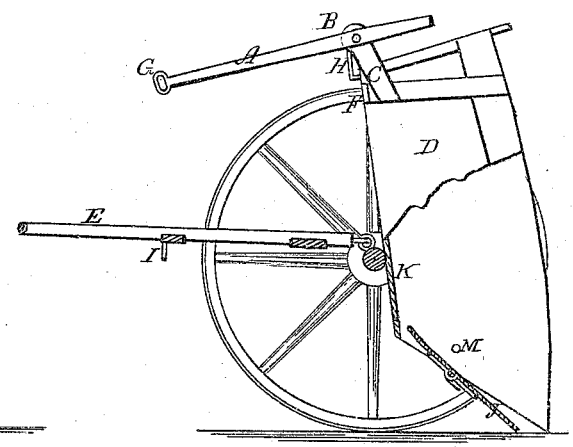
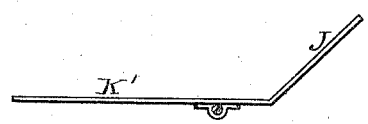
Witnesses:
J. West Wagner
Aug. H. Girard
Inventor:
Benjamin G. Fitzhugh
By Johnson, Klaucke & Co.
his Attorneys

UNITED STATES PATENT OFFICE.

BENJAMIN G. FITZHUGH, OF FREDERICK, MARYLAND, ASSIGNOR TO JACOB BYERLY, OF SAME PLACE.

IMPROVEMENT IN DUMPING-CARTS.

Specification forming part of Letters Patent No. 140,025, dated June 17, 1873; application filed October 5, 1872.

*To all whom it may concern:*

Be it known that I, BENJAMIN G. FITZHUGH, of the city and county of Frederick, in the State of Maryland, have invented certain new and useful Improvements in Dumping-Carts, of which the following is a specification:

My invention relates to carts constructed especially for dumping their loads; and the invention which forms the subject-matter of this patent consists in providing the front portion of the body of the cart with a pivoted lever projecting forward parallel with the shafts, and controlled by the driver, so as to dump the cart, bring the body again in position, and lock it to the shafts by hooks rendered automatic by the weight of the operating-lever. My invention further consists in combining with the body of the cart a pivoted tilting tail-board, which may also form a single piece, either entirely or partly with the bottom, in order that the tilting of the tail-board may also tilt the bottom or a section thereof in dumping earth or similar material; but in hauling stone the said pivoted tail-board and bottom are fixed in their positions so that the contents slide out over the inclined tail-board, as will be more fully hereinafter described.

In the accompanying drawings, Figure 1 represents an elevation of a cart embracing my invention. Fig. 2 represents an elevation showing the body dumped, and the pivoted tail-board in section and open. Fig. 3 represents a similar view, showing the tail-board and a section of the bottom of the cart formed in one piece and pivoted so as to tilt in dumping; and Fig. 4 the tail-board and bottom in one piece.

The lever A for effecting the dumping of the cart is pivoted, by means of a cross-bar, B, to the front projecting ends C of the side bars of the body D, so as to work just outside of the shafts E, with its inner end extending at the side of the body to catch upon a stop, F, and support the lever A for tilting the body, which is done by means of the forward end of the lever A, which extends nearly the length of the shafts, and has a grasp-hold, G, by which to pull up the body D when dumped. The body is locked to the shafts by means of a hook or hooks, H, on the cross-bar B, arranged to catch beneath a cross-bar, I, of the shafts E just in front of the body. This locking of the body is rendered automatic by the weight of the dumping-lever A, which, as the body is brought into position, bears the hook H beneath the cross-bar I, and holds it in its locked position until the body is to be dumped, when the raising of the lever A causes the hook H to move out from beneath the cross-bar I, and leave the body free to be dumped by the driver throwing the lever upward, the stop F on the body serving as a support for the inner end of the lever after the hook is disengaged. In this operation the lever is only raised against its stop F by a lifting force sufficient to carry the front of the body up as far as the driver can conveniently reach, when he completes the dumping by depressing the long end of the lever, and pushing upon its hinged or pivoted connection, as shown in Figs. 2 and 3 of the drawings. In this position of the lever the driver has complete control over the body, and can bring it back again in position upon the shafts by pulling with the lever, and by keeping it in a horizontal position until its hook H passes in front of the cross-bar I, when it passes thereunder by the weight of the free end of the lever, and thus holds the body securely locked until the lever is again raised by hand. The tail-board J of the cart is inclined outward, so as to form an angle with the bottom, and is pivoted so as to turn of itself when the body is dumped, and effectually clear the bottom and tail-board of the load. The tail-board J may be separate from the bottom K, and pivoted so as to be equally balanced, and held down or closed with its inner edge resting upon the rear end of the bottom by the weight of the load; or the tail-board J may form a part of, or made in one piece with, the entire bottom, the hinge or pivot in which case must be at the rear edge of the bottom, or lower rear corners of the sides of the body, as shown in Fig. 3; or in front of said angle, as shown in Fig. 4. In either of these plans the inner or front end of the tilting bottom K must rest upon ledges beneath the body D, so that the surface of the bottom will be uninterrupted in dumping the load. The tilting tail-board or bottom is used for dumping earth or other loose material, but when stone is being hauled the tail-board or bottom can be fixed and the stone dumped over the inclined tail-board. This is effected by fastening the tail-board or bottom with a button, L, or other device, to the body. In this way, when dumping loose earth, the tail-board will swing open from the bottom, or with the bottom, and clear the contents therefrom; and in again bringing up the body the tail-board will automatically close with the bottom and hold itself closed by its inclined position, or the weight of the bottom of which it may form a part, and thereby form a self-dumping and self-closing tail-board to the cart. The inclination of the rear ends of the sides of the body must be such that when it is dumped the upper outer corners of the sides will strike the ground, leaving the tail-board, which must be of less height than the sides, free to swing open at a greater inclination than the ends of the sides; and when the tail-board forms no fixed part of the bottom this position will also leave an open space between the end of the bottom and the inner edge of said tail-board, to let out the earth, both over the tail-board and between it and the bottom, as shown in Fig. 2.

I prefer to construct the tail-board in one piece with a section of the bottom, and hinge or pivot it at the angle to the body. When, however, the end gate is constructed in one piece with the bottom, the hinge or pivot should be on the bottom, so as to allow it to tilt readily when the body is dumped, as shown in Fig. 4.

It is obvious that as soon as the rear outer corners strike the ground the outer edge of the tail-board will be thrown open and also rest upon the ground, so as to entirely clear it of the earth as the body is pulled back into position upon the shafts, the tail-board being prevented from turning over outward by stop-pins M on the inner sides of the body.

Having described my invention, I claim—

1. A lever at the front end of the cart extending forward therefrom, and arranged to operate upon a stop thereon, to dump the body by raising and pushing it back upon its hinges, and to bring it again in position by pulling upon said lever, substantially as herein described.

2. The lever A and its catch H, operated by the weight of said lever, to automatically lock itself with the shafts, as described.

3. The combination, with the body and shafts of a cart, of the pivoted-lever A, the stop F, and the catch H, arranged to operate as described.

4. The tail-board J, pivoted to open when the body is about returning to its proper position upon the shaft, as set forth.

5. The tail-board constructed in one piece, or with a section of the bottom, and hinged or pivoted to swing or tilt independent of the body, to dump the load, substantially as described.

In testimony whereof I have hereunto set my hand this 20th day of September, A. D. 1872.

B. G. FITZHUGH.

Witnesses:
A. E. H. JOHNSON,
J. W. HAMILTON JOHNSON.